United States Patent
Matsumoto et al.

(10) Patent No.: US 7,197,916 B2
(45) Date of Patent: Apr. 3, 2007

(54) MISFIRE DETECTOR USING LINEAR DETECTION OF CRANKSHAFT ANGULAR SPEED

(75) Inventors: Koichiro Matsumoto, Kariya (JP); Naoki Kokubo, Nukata-gun (JP); Eiji Kogiso, Mizunami (JP); Takashi Kawashima, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/097,318

(22) Filed: Apr. 4, 2005

(65) Prior Publication Data

US 2005/0217356 A1 Oct. 6, 2005

(30) Foreign Application Priority Data

Apr. 5, 2004 (JP) .............................. 2004-111371

(51) Int. Cl.
*G01M 15/00* (2006.01)
(52) U.S. Cl. .................................................... 73/117.3
(58) Field of Classification Search .................. 73/116, 73/117.2, 117.3, 118.1
See application file for complete search history.

(56) References Cited

U.S. PATENT DOCUMENTS 5,245,865 A * 9/1993 Kayanuma ................. 73/117.3
5,245,866 A * 9/1993 Hashiguchi et al. ....... 73/117.3
5,287,737 A * 2/1994 Osawa et al. .............. 73/117.3
5,309,756 A * 5/1994 Osawa et al. ................ 73/116
5,499,537 A * 3/1996 Nakayama et al. ........ 73/117.3

FOREIGN PATENT DOCUMENTS

JP          A-9-32620         2/1997
JP        A-2000-205035       7/2000

* cited by examiner

*Primary Examiner*—Eric S. McCall
(74) *Attorney, Agent, or Firm*—Nixon & Vanderhye P.C.

(57) ABSTRACT

A misfire detector detects a misfire in a cylinder based on a maximum value and the minimum value of the angular speed. A first crank angle range is defined in such a manner as to include a crank angle in which the angular speed is maximum during a power stroke. A second crank angle range is defined in such a manner as to include a crank angle in which the angular speed is minimum during the power stroke. The maximum value of the angular speed is calculated within the first crank angle range, and the minimum value of the angular speed is calculated within the second crank angle range. The calculated maximum and minimum values are brought close to actual values to enhance a reliability of the misfire detector.

24 Claims, 6 Drawing Sheets

MISFIRE DETECTOR USING LINEAR DETECTION OF CRANKSHAFT ANGULAR SPEED

CROSS REFERENCE TO RELATED APPLICATIONS

This application is based on and incorporates herein by reference Japanese Patent Application No. 2004-111371 filed on Apr. 5, 2004, the disclosure of which is incorporated herein by reference.

FIELD OF THE INVENTION

The present invention relates to a misfire detector detecting a misfire in a cylinder of an internal combustion engine. The internal combustion engine is referred to as an engine hereinafter.

BACKGROUND OF THE INVENTION

Because a misfire in a cylinder of an engine causes a deterioration of an engine power and an increment of a rational fluctuation of the engine, it is important to detect a misfire precisely. Thus, a various types of misfire detector have been provided. The rational fluctuation of the engine represents an inevitable and periodical fluctuation of an angular speed ω of a crankshaft, which is referred to as an angular speed ω. Combustion of a fuel generating a rotational torque of the crankshaft causes the fluctuation of the angular speed ω.

A conventional misfire detector detects the misfire by measuring a rotational-varying amount E. The rotational-varying amount E is defined by a difference between a maximum value ωmax of the angular speed ω and a minimum value ωmin in a present cylinder, or a difference between a maximum value ωmax and a minimum value ωmin in a next cylinder in which fuel combustion is carried out succeeding to the present cylinder. Alternatively, the rotational-varying amount E is defined by the maximum value ωmax of the angular speed ω, or the minimum value ωmin itself.

The misfire detector determines whether the misfire has occurred, comparing a variation amount of the rotational-varying amount E with a threshold. The angular speed ω is detected by a crank angle detecting means which outputs an electric signal, which is referred to as a crank angle signal hereinafter. The crank angle detecting means comprises a subject portion and a detecting portion. The subject portion is provided on an end of crankshaft, and the detecting portion detects the rotational position of the subject portion in order to output the crank angle signal.

The conventional subject portion of the crank angle detecting means is a circular metal plate having protrusions at a predetermined angular interval on an outer circumference thereof. As shown in FIG. 6A, since pulse signals of the crank angle signal are generated every 30° CA of the crank angle θ, the detected values of the angular speed ω are indicated every 30° CA of the crank angle θ as shown in FIG. 6B.

JP-9-32620A shows that the maximum value ωmax and the minimum value ωmin of the angular speed ω are derived by applying the detected angular speed ω to a predetermined crank angle θ. For example, in the case of a four-cylinder engine, the maximum values ωmax are the detected angular speed when the crank angle θ is respectively 30, 210, 390, and 570° CA, and the minimum values ωmix are the detected angular speed when the crank angle is respectively 120, 300, 480, and 660° CA. Thus, relatively large differences between the detected values ωmax, ωmix and actual values results in a deterioration of the reliability in detecting the misfire.

Furthermore, the circular metal plate of the crank angle detecting means has a missing tooth portion on the outer circumference thereof to detect a reference position for counting the number of pulse signals. As shown in FIG. 6A, the crank angle signal in the crank angle θ corresponding to the missing tooth portion is changed into the pulse signal that requires a longer time than the other crank angle signals are changed. As shown in FIG. 6B, the detected values of the angular speed ω rapidly falls at the crank angle θ (120 and 480°0 CA) corresponding to the missing tooth portion, and then rapidly rises at the succeeding crank angle θ (150 and 510° CA) in which the angular speed is measured. Thus, the difference between the derived values and the actual values in the maximum value ωmax and the minimum value ωmin are increased in the crank angle θ affected by the missing tooth portion.

SUMMARY OF THE INVENTION

The present invention is made in view of the foregoing matter and it is an object of the present invention to provide a misfire detector, which has an improved reliability in detecting a misfire in a cylinder of an engine by bringing calculated maximum and minimum values of an angular speed of a crankshaft close to actual values thereof.

According to the present invention, a misfire detector includes a crank angle detecting means continuously detecting a signal indicative of an angular speed of a crankshaft; a first means for defining a first crank angle range corresponding to at least one part of a power stroke in the cylinder; and a second means for defining a second crank angle range corresponding to one part of the power stroke in the cylinder. The second crank angle range is in retard of the first crank angle range. The misfire detector further includes a misfire determining means for determining whether an abnormal combustion has occurred in the cylinder based on a parameter of the cylinder. The parameter is a difference between a maximum value of an angular speed within the first crank angle range of the cylinder and a minimum value of the angular speed within the second crank angle range of the cylinder.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

[First Embodiment]

Figure 1:
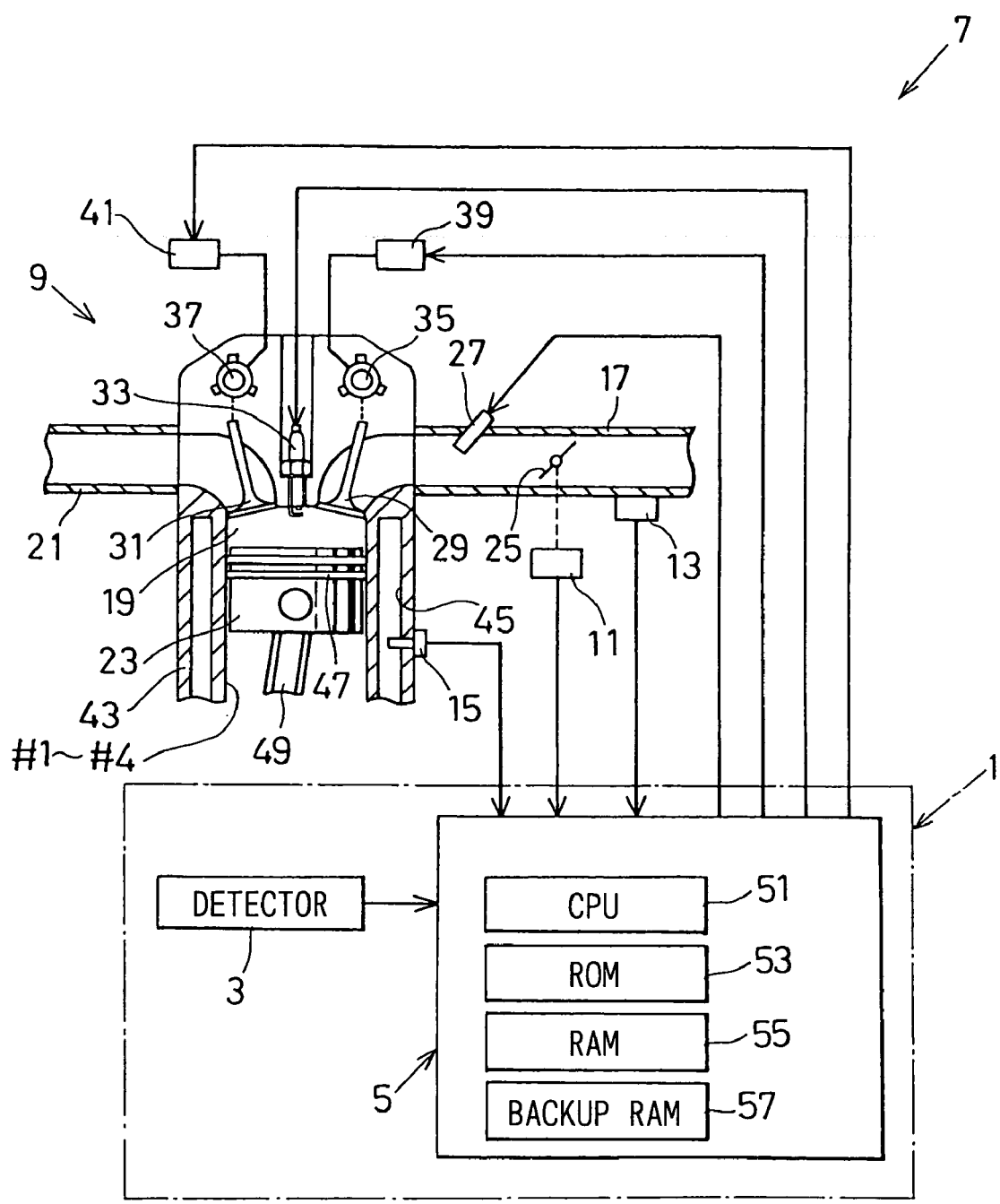
FIG. 1 is a schematic view showing an engine control system including a misfire detector according to a first embodiment.

Referring to FIGS. 1 to 3, a misfire detector 1 according to the first embodiment is described hereinafter.

As shown in FIG. 1, the misfire detector 1 includes a crank angle detecting means 3 and an electric control unit 5, which is referred to as ECU 5. The crank angle detecting means 3 successively detects crank angle signal for measuring a crank angle θ and an angular speed ω. The ECU 5 receives the crank angle signal and the other signal output from the other detecting means in order to conduct a detection of misfire.

Referring to FIG. 1, an engine control system 7 including the misfire detector 1 is described hereinafter. The engine control system 7 is provided with an engine 9 which includes four cylinders #1 to #4, the crank angle detecting means 3, a throttle sensor 11, an airflow meter 13, a water temperature sensor 15, and the ECU 5.

The engine 9 has well-known structure in which air-fuel mixture supplied from an intake pipe 17 is burned and expanded in a combustion chamber 19 of each of the cylinders #1 to #4, and then the burned air-fuel mixture is exhausted from an exhaust pipe 21. A piston 23 reciprocates in each of the cylinders #1 to #4 to rotate a crankshaft (not shown).

The intake pipe 17 is provided with a throttle valve 25 adjusting an amount of airflow, and an injector 27 supplying a fuel into the combustion chamber 19.

At an upper portion of the combustion chamber 19, an intake valve 29 for sucking the air-fuel mixture into the combustion chamber 19, an exhaust valve 31 for expelling the exhaust gas from the combustion chamber 19, and a spark plug 33 for igniting the air-fuel mixture are provided. The intake valve 29 and the exhaust valve 31 are respectively driven by an intake camshaft 35 and an exhaust camshaft 37. An intake-side valve-timing controller 39 and an exhaust-side valve-timing controller 41 respectively adjust the valve timing of the intake valve 29 and the exhaust valve 31.

A cylinder block 43 forming the cylinders #1 to #4 is provided with a coolant passage 45 through which an engine coolant circulates so as to cool the engine 9. A connecting rod 49 connects the piston 23 with the crankshaft. Piston 23 typically also carries rings 47 as will be appreciated.

The crank angle detecting means 3 detects the crank angle signals to output them to the ECU 5. The crank angle detecting means 3 includes a subject portion (not shown) provided on the crankshaft, and a detecting portion (not shown) outputting the crank angle signals according to a rotation of the subject portion. In this embodiment, the subject portion comprises a permanent magnet provided on the crankshaft to rotate together. The detecting portion comprises a coil (not shown) which generates electricity which successively changes in a sinusoidal wave according to the rotation of the permanent magnet.

Figure 2A:
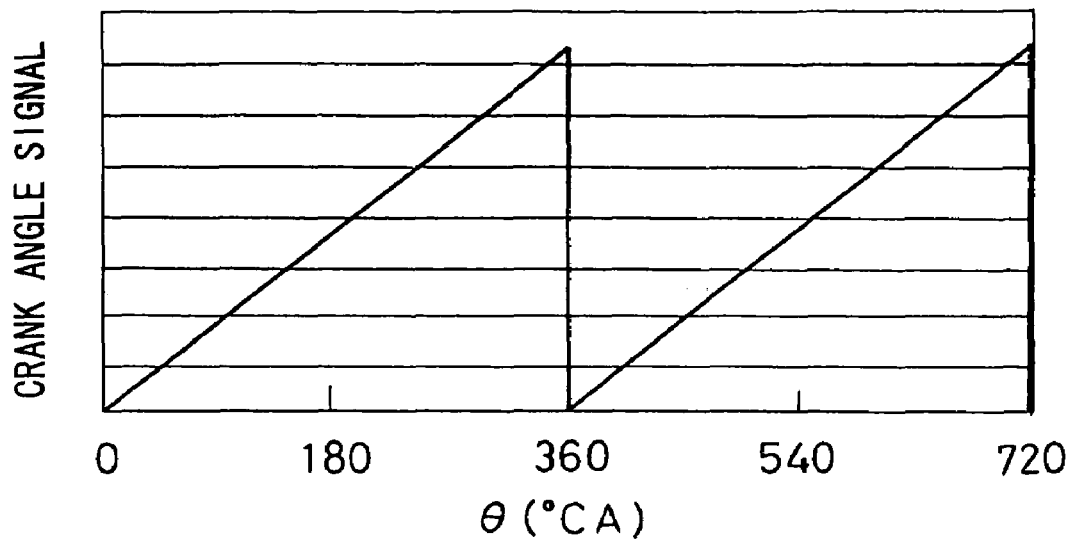
FIG. 2A is a chart showing relationship between a crank angle θ and a crank angle signal according to the first embodiment.
Figure 2B:
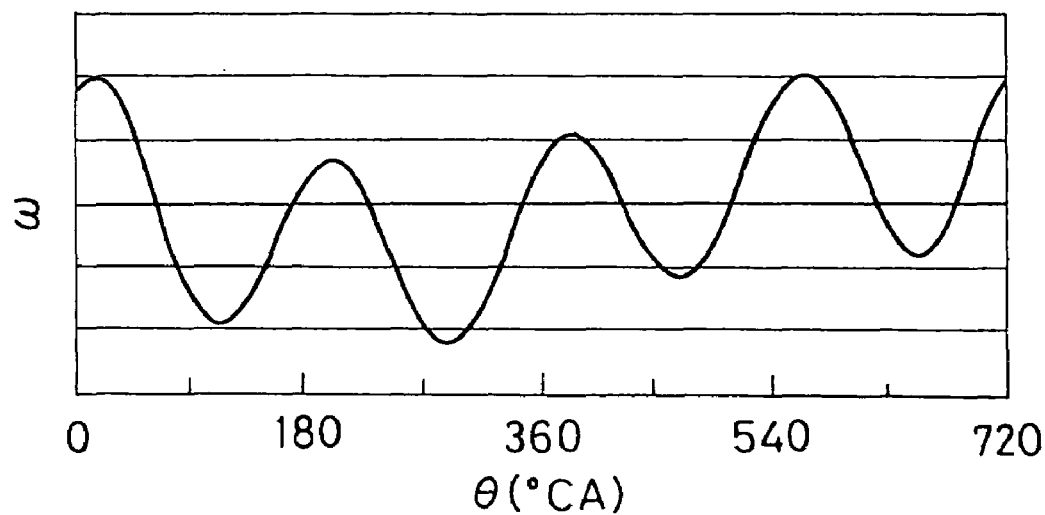
FIG. 2B is a graph showing an angular speed ω with respect to the crank angle θ according to the first embodiment.

Thereby, the crank angle detecting means 3, as shown in FIG. 2A, outputs the crank angle signal which is linear to the crank angle θ by converting the electricity generated in the coil with an inverse trigonometric function. Thus, as shown in FIG. 2B, the angular speed ω can be detected as a continuous value.

As shown in FIG. 1, the throttle sensor 11 detects an electric signal indicative of the opening degree of the throttle valve 25 to output the electric signal to the ECU 5. The airflow meter 13 detects an electric signal indicative of an air mount introduced to the combustion chamber 19 to output the electric signal to the ECU 5. The water temperature sensor 15 detects an electric signal indicative of the temperature of water in the coolant passage 45 to output the electric signal to the ECU 5.

The ECU 5 includes a CPU 51 processing control calculations; a memory device such as a ROM 53, a RAM 55, and a backup RAM 57; an input device (not shown); and an output device (not shown). The ECU 5 receives electric signals from the crank angle detecting means 3, the throttle sensor 11, the airflow meter 13, and the water temperature sensor to output electric signals for controlling the injector 22, the spark plug 33, and the intake-side and exhaust-side valve timing controllers 39, 41.

The ECU 5 serves as a misfire determining means in the present invention, which determines whether a misfire has occurred based on the crank angle signal output from the crank angle detecting means 3. The ECU 5 stores a first crank angle range a1 and a second crank angle range a2, which are used in determining the misfire.

As shown in FIG. 3, the first crank angle range a1 is set in such a manner as to respectively correspond to one part of angle in the power stroke b1 to b4. The power stroke b1 to b4 is a stroke from the time when the piston 23 slides up to a top dead center (TDC 1–TDC 4) with air-fuel mixture compressed in the combustion chamber 19 of the present cylinder #1 to #4 to the time when the piston 23 of the next cylinder #1 to #4 slides down to bottom dead center with the air-fuel mixture being burned. In the engine 9 having four-cylinders #1 to #4, the power stroke b1 to b4 approximately corresponds to a period from the time when the one of the piston is at the top dead center to the time when the next piston is at the top dead center. The first crank angle range a1 includes a maximum crank angle θmax in which the angular speed ω is estimated to be maximum. The first crank angle range a1 is respectively defined to each of the power stroke b1 to b4.

The second crank angle range a2, as shown in FIG. 3, is in retard of the first crank angle range a1, and corresponds to one part of angle in the power stroke b1 to b4. The second crank angle range a2 includes a minimum crank angle θmin in which the angular speed ω is estimated to be minimum. The second crank angle range a2 is respectively defined to each of the power stroke b1 to b4.

[Method of Detecting Misfire]

Figure 4:
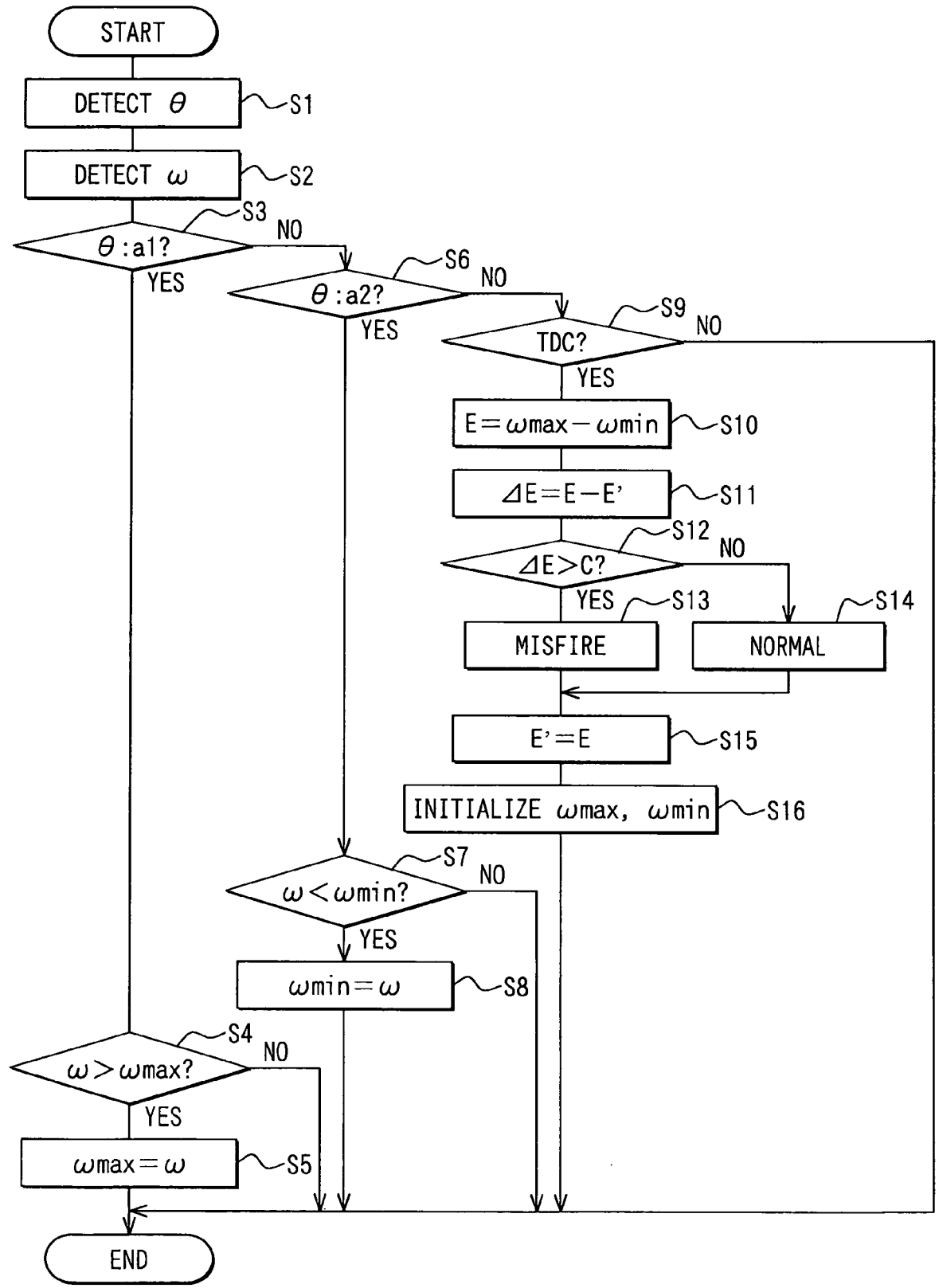
FIG. 4 is a flowchart showing a misfire detection routine according to the first embodiment.

Referring to FIG. 4, a method of detecting a misfire according to the first embodiment is described hereinafter. FIG. 4 is a flowchart showing a misfire detecting routine. The ECU 5 stores and executes the routine program to serve as the misfire determining means.

In step S1 and step S2, the crank angle θ and the angular speed ω is respectively detected. In step S3, the ECU 5 determined whether the crank angle θ is included in the first crank angle range a1 of each cylinder #1 to #4. When it is Yes in step S3, the procedure proceeds to step S4 and step S5 to calculate maximum value ωmax of the angular speed ω. That is, in step S4, the ECU 5 determines whether the detected angular speed ω is larger than the present maximum value ωmax. When it is Yes in step S4, the present maximum value ωmax is replaced by the detected angular speed ω in step S5.

When the ECU 5 determines that the crank angle θ is out of the first crank angle range a1 of the respective cylinder #1 to #4 in step S3, the ECU 5 determines whether the crank angle θ is included in the second crank angle rage a2 of the respective cylinder #1 to #4 in step S6. When it is Yes in step S6, the procedure proceeds to step S7 and step S8 to calculate the minimum value ωmin of the angular speed ω. That is, in step S7, the ECU 5 determines whether the detected angular speed ω is smaller than the present maximum value ωmin. When it is Yes in step S4, the present maximum value ωmin is replaced by the detected angular speed ω in step S8.

When it is No in step S6, the ECU determines whether a piston in the next cylinder #1 to #4 is at the top dead center TDC 1 to TDC 4 in step S9. When it is determined Yes in step S9, the procedure proceeds to steps S10 to S12 to determine whether the misfire has occurred in the cylinder #1 to #4. That is, in step S10, a difference between the maximum value ωmax and the minimum value ωmax is calculated. This difference corresponds to a rotational-varying amount E. In step S11, the difference ΔE between the present rotational-varying amount E and the previous rotational-varying amount E'. When the ECU 5 determines that the difference ΔE is larger than a predetermined value C in step S12, the procedure proceeds to step S13 to determine that the misfire has occurred. When it is No in step S12, the ECU 5 determines that air-fuel mixture is normally burned in step S14.

In step S15, the previous rotational-varying amount E' is replaced by the present rotational-varying amount E in step S16. In step S16, the maximum value ωmax and the minimum value ωmin are initialized.

[Operation of the First Embodiment]

An operation of the misfire detector 1 is described hereinafter.

The misfire detector 1 executes the misfire detecting routine to calculate the maximum value ωmax in the first crank angle a1 and the minimum value ωmin in the second crank angle a2 during the respective power stroke b1 to b4. The difference ΔE of the rotational-varying amount E is calculated every time when the piston of each cylinder #1 to #4 slides up to the top dead center TDC 1 to TDC 4.

Figure 3A:
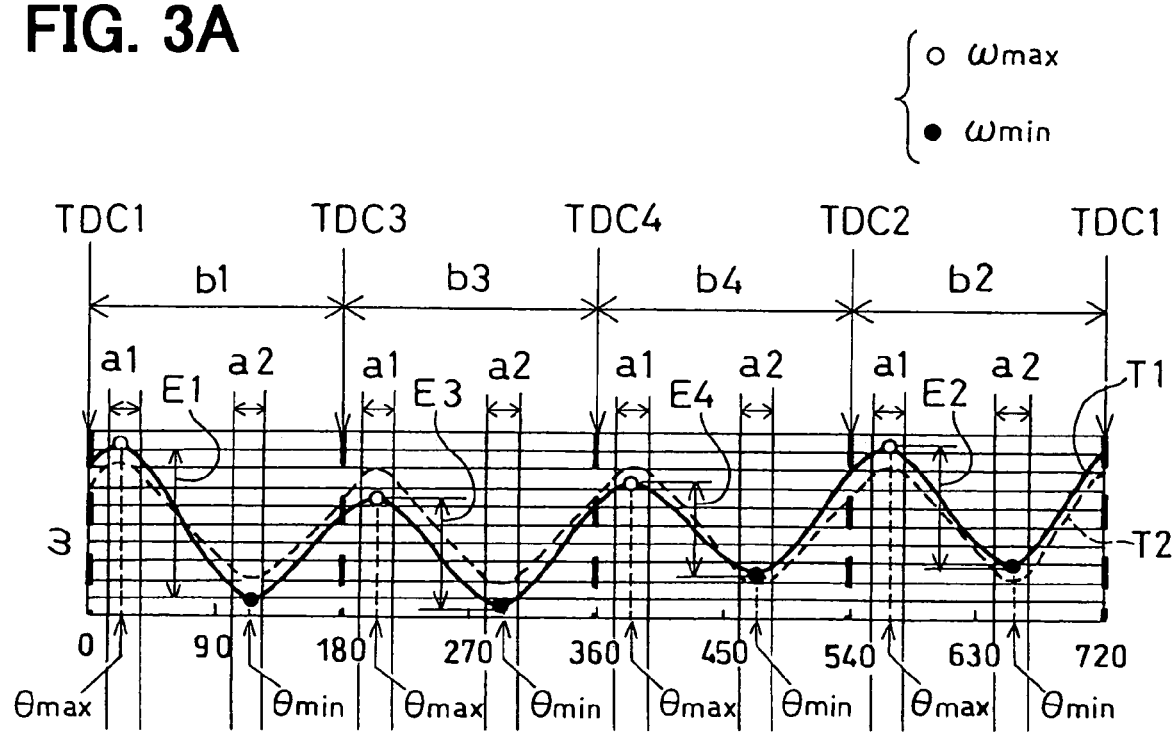
FIG. 3A is a graph showing the angular speed ω, with an engine in high speed and under low load according to the first embodiment.

FIG. 3A is a time chart showing a variation of the angular speed ω, with the engine 9 running in a high speed and under a low load. A trend T1 shows a variation of the angular speed ω in an abnormal condition in which the misfire has occurred in the cylinder #1 during the power stroke b1, and a trend T2 shows a variation of the angular speed ω in a normal condition in which no misfire has occurred.

The misfire in the power stroke b1 causes the difference ΔE between the rotational-varying amount E1 during the power stroke b1 and the rotational-varying amount E2 during the power stoke b2 to be larger than the predetermined value C. When the piston in the cylinder #3 slides up to the top dead center TDC 3, the ECU 5 determines that the misfire has occurred in the cylinder #1. The difference ΔE between the rotational-varying amount E3 during the power stroke b3 and the rotational-varying amount E4 during the power stroke b4; the difference ΔE between the amount E4 during the power stroke b4 and the amount E2 during the power stroke b2; and the difference ΔE between the amount E2 during the power stroke b2 and the amount E1 during the power stroke b1 are respectively smaller than the predetermined value C. Thus, when a piston 23 in each cylinder #4, #2, #1 slides up to the top dead center TDC 4, TDC 2, and TDC 1, the ECU determines that the air-fuel mixture is normally burned in each cylinder #3, #4, #2.

Figure 3B:
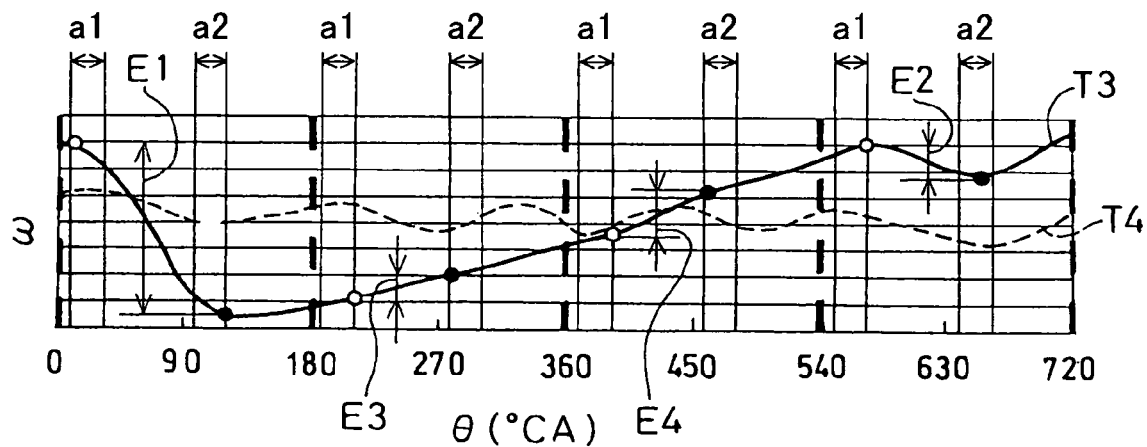
FIG. 3B is a graph showing the angular speed ω, with an engine under high load according to the first embodiment.

FIG. 3B is a time chart showing a variation of the angular speed ω, with the engine 9 running under a high load. A trend T3 shows a variation of the angular speed ω in an abnormal condition in which the misfire has occurred in the cylinder #1 during the power stroke b1, and a trend T4 shows a variation of the angular speed ω in a normal condition in which no misfire has occurred.

When the misfire has occurred during the power stroke b1, the difference ΔE between the amount E1 during power stroke b1 and the amount E3 during stroke b3 is larger than the predetermined value C. When the piston 23 in the cylinder #3 slides up to the top dead center TDC 3, the ECU 5 determines the misfire has occurred in the cylinder #1. The difference ΔE between the rotational-varying amount E3 during the power stroke b3 and the rotational-varying amount E4 during the power stroke b4; the difference ΔE between the amount E4 during the power stroke b4 and the amount E2 during the power stroke b2; and the difference ΔE between the amount E2 during the power stroke b2 and the amount E1 during the power stroke b1 are respectively smaller than the predetermined value C. Thus, when a piston 23 in each cylinder #4, #2, #1 slides up to the top dead center TDC 4, TDC 2, and TDC 1, the ECU determines that the air-fuel mixture is normally burned in each cylinder #3, #4, #2. In the expansion strokes b3, b4, the minimum value ωmin is smaller than the maximum value ωmax, so that the amount E3 and the amount E4 are negative value.

As described above, the misfire detector 1 according to the first embodiment, the misfire detection in the present cylinder #1 to #4 is conducted based on the difference ΔE between the rotational-varying amount E of the present cylinder #1 to #4 and the rotating-varying amount E of the next cylinder #1 to #4. That is, when the misfire detection is conducted with respect to the cylinder #1, the rotational-varying amount E3 of the cylinder #3, in which the air-fuel mixture is burned next to the cylinder #1, is used as a parameter to derive the difference ΔE. The rotational-varying amount E of the next cylinder in which the combustion will occur following the present cylinder is used as the parameter to derive the difference ΔE.

[Effect of the First Embodiment]

According to the misfire detector 1 of the first embodiment, the first crank angle range a1 is defined in such a manner as to include the crank angle θmax in which the angular speed ω is estimated to be maximum during each of the power stroke b1 to b4, and the second crank angle range a2 is defined in such a manner as to include the crank angle θmin in which the angular speed ω is estimated to be minimum during each of the power stroke b1 to b4. The maximum value ωmax is calculated within the first crank angle range a1 of each cylinder #1 to #4 and the minimum value ωmin is calculated within the second crank angle range a2 of each cylinder #1 to #4. According to the rotational-varying amount E that is the difference between the maximum value ωmax and the minimum value ωmin, the misfire detection is conducted.

Thereby, the calculated maximum value ωmax and the minimum value ωmin are brought close to the actual values, so that the reliability of the misfire detection is enhanced. The misfire detector 1 can bring the maximum value ωmax and the minimum value ωmin to the actual values even if the spark timing is advanced or retarded based on the spark timing control. Furthermore, even in a sudden change in the angular speed ω, the maximum value ωmax and the minimum value ωmin are brought close to the actual values.

The crank angle detecting means 3 can output linear crank angle signal with respect to the crank angle θ, whereby no reference position is necessary to count the number of the pulse signals so that the fluctuation of the measured angular speed ω due to the detection of the reference position can be restricted. Therefore, the maximum value ωmax and the minimum value ωmin can be brought close to the actual values at every crank angle θ.

The maximum value ωmax is calculated within only the first crank angle range a1, and the minimum value ωmax is calculated within only the second crank angle range a2. The narrower first and second crank angle ranges a1, a2 reduce arithmetical loads of ECU 5.

[Second Embodiment]
[Method of Detecting Misfire]

Figure 5:
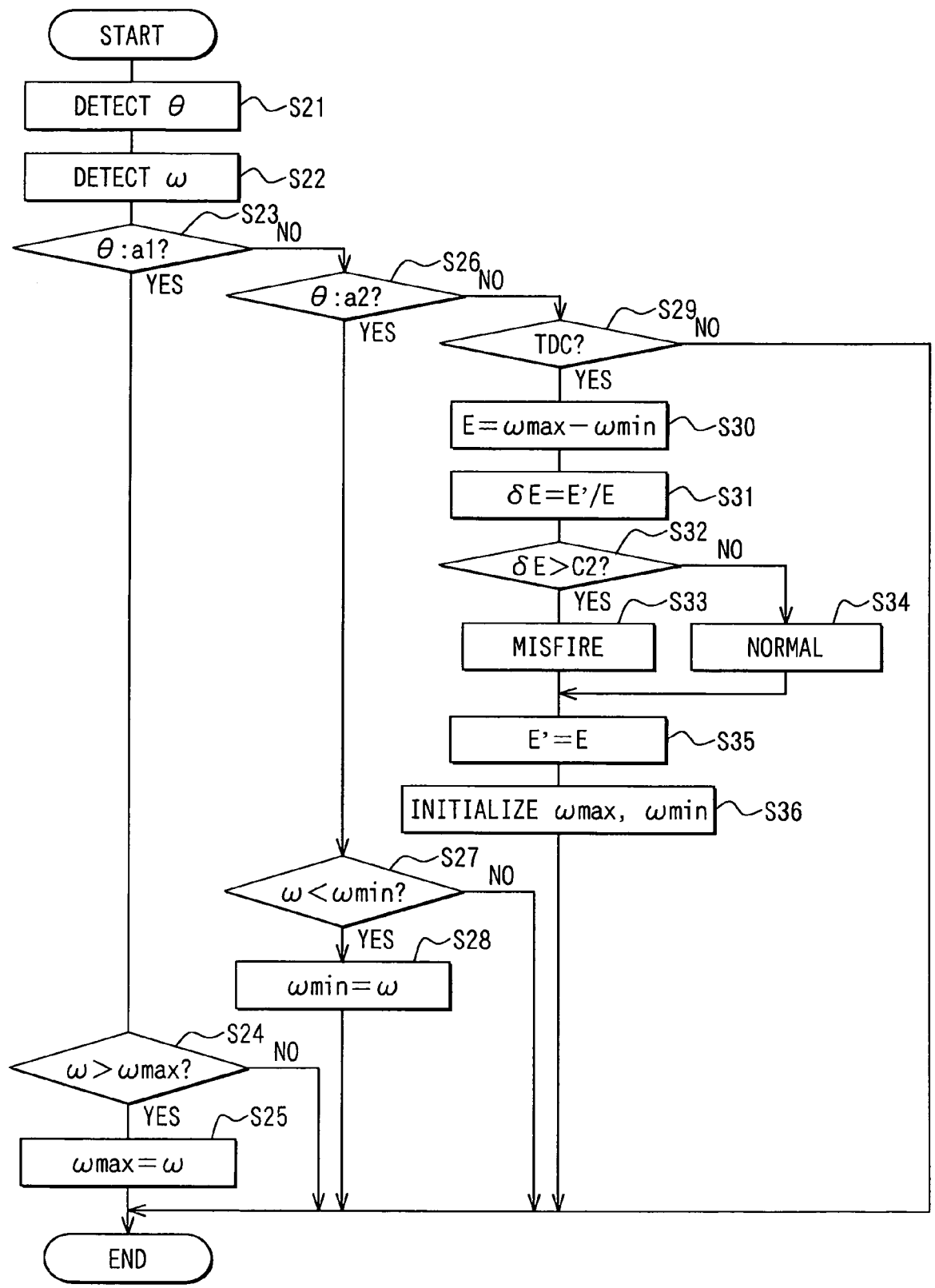
FIG. 5 is a flowchart showing a misfire detection routine according to a second embodiment.
Figure 6A:
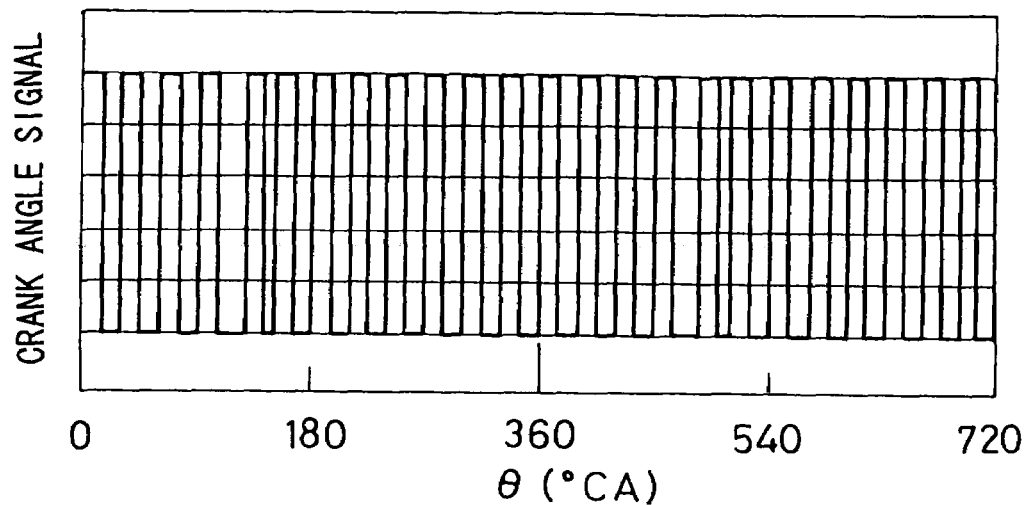
FIG. 6A is a chart showing relationship between a crank angle θ and a crank angle signal according to a conventional device.
Figure 6B:
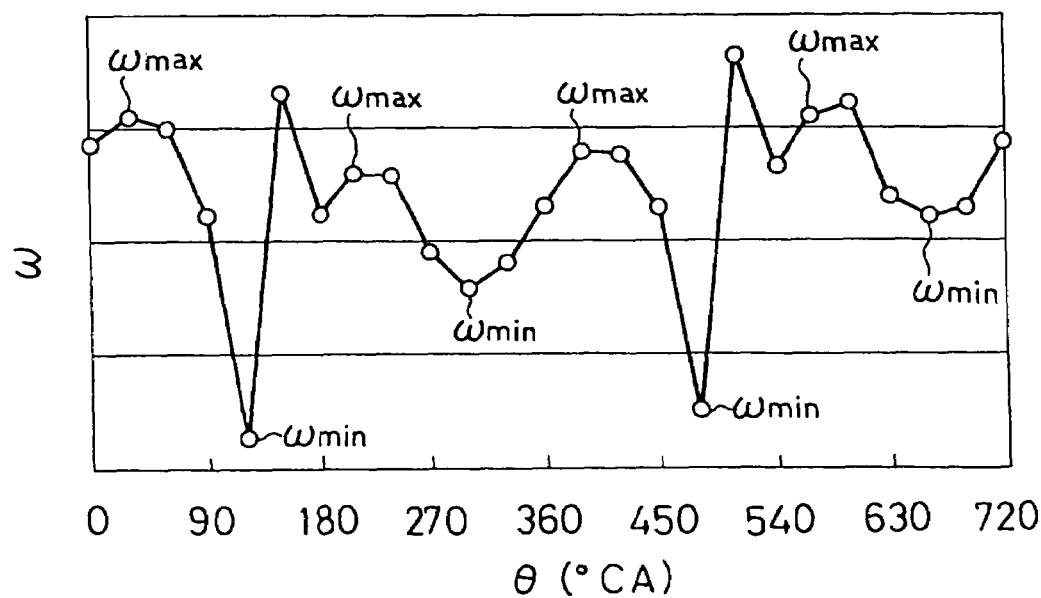
FIG. 6B is a graph showing an angular speed ω with respect to the crank angle θ according to the conventional device.

A ration δE between the present rotational-varying amount E and the previous rotational varying amount E' is calculated in determining whether the misfire has occurred in the cylinder #1 to #4. The misfire detection is conducted based on the ratio δE. As shown in FIG. 5, the ratio δE is calculated in step S31. When the ECU 5 determines that the ratio δE is larger than the predetermined value C2, the procedure proceeds to step S33 to determine the misfire has occurred. When it is No in step S32, the procedure proceeds to step S34 to determine the air-fuel mixture is normally burned. Steps S21 to S30, S35 and S36 in FIG. 5 correspond to steps S1 to S10, S15 and S16.

[Effect of the Second Embodiment]

The misfire detector 1 according to the second embodiment, the misfire detection is conducted based on the ratio δE, which indicates the rotational-varying amount E. The angular speed ω, which is used in calculating the amount E, fluctuates according to the condition of the engine 9, such as a rotational speed and a load of the engine. Thus, a threshold for the misfire detection is necessary to be changed according to the condition of the engine 9. The ratio δE can reduce affects of the engine condition to decrease the changing range of the threshold (the predetermined value C2).

[Modification]

The misfire detection can be conducted based on the rotational-varying amount E, which is a difference between the maximum value ωmax within the first crank angle range a1 of the succeeding cylinder #1 to #4 and the minimum value ωmin within the second crank angle range a2 of the present cylinder #1 to #4. Alternatively, the rotational-varying amount E can be the maximum value ωmax within the first crank angle range a1 of the present cylinder #1 to #4. The rotational-varying amount E can be the minimum value ωmin within the second crank angle range a2 of the present cylinder #1 to #4.

In the above embodiments, the rotational-varying amount E of the next cylinder #1 to #4 is used as the parameter to derive the difference ΔE or ratio δE. In the modification, the rotational-varying amount E of the arbitrary succeeding cylinder #1 to #4 in which the fuel injection is conducted after the next cylinder #1 to #4 can be adopted. For example, when the misfire detection is conducted with respect to the cylinder #1, the parameter for deriving the difference ΔE or ratio δE can be selected among the cylinders #4, #2, #1 in which the fuel injection is conducted after the cylinder #3 posterior to the cylinder #1. The fuel injection is repeatedly conducted in the cylinder #3, the cylinder #4, the cylinder #2, and the cylinder #1 in this order. The parameter for deriving the difference ΔE and the ratio δE can be selected among the rotational-varying amount E of the arbitrary next cylinder #1 to #4 (or the arbitrary succeeding cylinders) of the engine cycle posterior to the present engine cycle.

The first crank angle range a1 can be set over the power stroke b1 to b4 of the cylinder #1 to #4 in which the air-fuel mixture is burned before in the present cylinder #1 to #4. The second crank angle range a2 can be set over the power stroke b1 to b4 of the cylinder #1 to #4 in which the air-fuel mixture is burned before in the present cylinder #1 to #4.

The angular speed ω can be detected after the determination whether the crank angle θ within the first and the second crank angle range a1, a2. Thereby, the number of detection of the angular speed ω is decreased, so that the arithmetical load of the ECU 5 is reduced.

What is claimed is:

1. A misfire detector detecting an abnormality of a fuel combustion in a cylinder of an internal combustion engine, the misfire detector comprising:

a crank angle detecting means continuously and linearly detecting a signal indicative of an angular speed of a crankshaft to produce an output which varies linearly with respect to variation of crankshaft angular speed;

a first means for defining a first crank angle range corresponding to at least one part of a power stroke in the cylinder;

a second means for defining a second crank angle range corresponding to one part of the power stroke in the cylinder, the second crank angle range being in retard of the first crank angle range; and a misfire determining means for determining whether an abnormal combustion has occurred in the cylinder based on a parameter of the cylinder, the parameter being a difference between a maximum value of an angular speed within the first crank angle range of the cylinder and a minimum value of the angular speed within the second crank angle range of the cylinder.

2. The misfire detector according to claim 1, wherein the misfire determining means calculates a second parameter of an arbitrary next cylinder based on a difference between a maximum value of the angular speed and a minimum value of the angular speed, the maximum value of the angular speed is detected within the first crank angle range of the arbitrary next cylinder in which a fuel combustion is conducted after the fuel combustion in the cylinder, the minimum value of the angular speed is detected within the second crank angle range of the arbitrary next cylinder, and the misfire determining means determines whether the abnormal combustion has occurred based on a difference between the parameter of the cylinder and the second parameter of the arbitrary next cylinder.

3. The misfire detector according to claim 1, wherein the misfire determining means calculates a second parameter of an arbitrary next cylinder based on a difference between a maximum value of the angular speed and a minimum value of the angular speed, the maximum value of the angular speed is detected within the first crank angle range of the arbitrary next cylinder in which a fuel combustion is conducted after a fuel combustion in the cylinder, the minimum value of the angular speed is detected within the second crank angle range of the arbitrary next cylinder, and the misfire determining means determines whether the abnormal combustion has occurred based on a ratio between the parameter and the second parameter.

4. A misfire detector detecting an abnormality of a fuel combustion in a cylinder of an internal combustion engine, the misfire detector comprising:

a crank angle detecting means continuously and linearly detecting a signal indicative of an angular speed of a crankshaft to produce an output which varies linearly with respect to variation of crankshaft angular speed;

a first means for defining a first crank angle range corresponding to at least one part of a power stroke in the cylinder;

a second means for defining a second crank angle range corresponding to one part of the power stroke in the cylinder, the second crank angle range being in retard of the first crank angle range; and a misfire determining means for determining whether an abnormal combustion has occurred in the cylinder based on a parameter of the cylinder, the parameter being a difference between a maximum value of an angular speed within the first crank angle range of a next cylinder in which the fuel combustion is conducted right after the fuel combustion in the cylinder and a minimum value of the angular speed within the second crank angle range of the cylinder.

5. The misfire detector according to claim 4, wherein the misfire determining means calculates a second parameter of an arbitrary next cylinder based on a difference between a maximum value of the angular speed and a minimum value of the angular speed, the maximum value of the angular speed is detected within the first crank angle range of the arbitrary succeeding cylinder in which a fuel combustion is conducted after the fuel combustion in the next cylinder, the minimum value of the angular speed is detected within the second crank angle range of the arbitrary next cylinder in which a fuel combustion is conducted just before the fuel combustion in the arbitrary succeeding cylinder, and the misfire determining means determines whether the abnormal combustion has occurred based on a difference between the parameter of the cylinder and the second parameter of the arbitrary next cylinder.

6. The misfire detector according to claim 4, wherein the misfire determining means calculates a second parameter of an arbitrary next cylinder based on a difference between a maximum value of the angular speed and a minimum value of the angular speed, the maximum value of the angular speed is detected within the first crank angle range of the arbitrary succeeding cylinder in which a fuel combustion is conducted after the fuel combustion in the next cylinder, the minimum value of the angular speed is detected within the second crank angle range of the arbitrary next cylinder in which a fuel combustion is conducted just before the fuel combustion in the arbitrary succeeding cylinder, and the misfire determining means determines whether the abnormal combustion has occurred based on a ratio between the parameter and the second parameter.

7. A misfire detector detecting an abnormality of a fuel combustion in a cylinder of an internal combustion engine, the misfire detector comprising:

a crank angle detecting means continuously and linearly detecting a signal indicative of an angular speed of a crankshaft to produce an output which varies linearly with respect to variation of crankshaft angular speed;

a means for defining a crank angle range corresponding to at least one part of a power stroke in the cylinder; and a misfire determining means for determining whether an abnormal combustion has occurred in the cylinder based on a parameter of the cylinder, the parameter being a maximum value of the angular speed within the crank angle range.

8. The misfire detector according to claim 7, wherein the misfire determining means determines whether the abnormal combustion has occurred in the cylinder based on a difference between the parameter of the cylinder and a second parameter of an arbitrary next cylinder in which the fuel combustion is conducted after the fuel combustion in the cylinder, the second parameter is a maximum value of the angular speed of the arbitrary next cylinder, and the maximum value is detected within the crank angle range.

9. The misfire detector according to claim 7, wherein the misfire determining means determines whether the abnormal combustion has occurred in the cylinder based on a ratio between the parameter of the cylinder and a second parameter of an arbitrary next cylinder in which the fuel combustion is conducted after the fuel combustion in the cylinder, the second parameter is a maximum value of the angular speed of the arbitrary next cylinder, and the maximum value is detected in the crank angle range.

10. A misfire detector detecting an abnormality of a fuel combustion in a cylinder of an internal combustion engine, the misfire detector comprising:

a crank angle detecting means continuously and linearly detecting a signal indicative of an angular speed of a crankshaft to produce an output which varies linearly with respect to variation of crankshaft angular speed, a means for defining a crank angle range corresponding to at least one part of a power stroke in the cylinder; and a misfire determining means for determining whether an abnormal combustion has occurred in the cylinder based on a parameter of the cylinder, the parameter being a minimum value of the angular speed within the crank angle range.

11. The misfire detector according to claim 10, wherein the misfire determining means determines whether the abnormal combustion has occurred in the cylinder based on a difference between the parameter of the cylinder and a second parameter of an arbitrary next cylinder in which the fuel combustion is conducted after the fuel combustion in the cylinder, the second parameter is a minimum value of the angular speed of the arbitrary next cylinder, and the minimum value is detected within the crank angle range of the arbitrary next cylinder.

12. The misfire detector according to claim 10, wherein the misfire determining means determines whether the abnormal combustion has occurred in the cylinder based on a ratio between the parameter of the cylinder and a second parameter of an arbitrary next cylinder in which the fuel combustion is conducted after the fuel combustion in the cylinder, the second parameter is a minimum value of the angular speed of the arbitrary next cylinder, and the minimum value is detected within the crank angle range of the arbitrary next cylinder.

13. A method for detecting a fuel combustion misfire abnormality in a cylinder of an internal combustion engine, the method comprising:

generating a signal representing crankshaft angular speed which varies linearly with respect to variation of crankshaft angular speed;

defining a first crank angle range corresponding to at least one part of a power stroke in the cylinder;

defining a second crank angle range corresponding to one part of the power stroke in the cylinder, the second crank angle range being in retard of the first crank angle range;

determining whether an abnormal combustion has occurred in the cylinder based on a parameter representing a difference between maximum angular crankshaft speed within the first crank angle range of the cylinder and minimum angular crankshaft speed within the second crank angle range of the cylinder; and outputting a signal representing a detected misfire abnormality in response to said determination.

14. A method as in claim 13 wherein:

the determining step calculates a second parameter for an arbitrary next cylinder based on a difference between maximum angular crankshaft speed and minimum angular crankshaft speed, the maximum angular crankshaft speed being detected within the first crank angle range of the arbitrary next cylinder in which fuel combustion occurs, the minimum angular crankshaft speed being detected within the second crank angle range of the arbitrary next cylinder, and the determining step determines whether abnormal combustion has occurred based on a difference between the first-mentioned parameter and the second parameter.

15. A method as in claim 13 wherein:

the determining step calculates a second parameter of an arbitrary next cylinder based on a difference between maximum angular crankshaft speed and minimum angular crankshaft speed, the maximum angular crankshaft speed being detected within the first crank angle range of the arbitrary next cylinder in which fuel combustion occurs, the minimum angular crankshaft speed being detected within the second crank angle range of the arbitrary next cylinder, and the determining step determines whether abnormal combustion has occurred based on a ratio between the first-mentioned parameter and the second parameter.

16. A method for detecting a misfire abnormality of fuel combustion in a cylinder of an internal combustion engine, the method comprising:

generating a signal representing angular crankshaft speed which varies linearly with respect to variation of crankshaft angular speed;

defining a first crank angle range corresponding to at least one part of a power stroke in the cylinder;

defining a second crank angle range corresponding to one part of the power stroke in the cylinder, the second crank angle range being in retard of the first crank angle range; and determining whether an abnormal combustion has occurred in the cylinder based on a parameter representing a difference between maximum angular crankshaft speed within the first crank angle of a next cylinder in which fuel combustion next occurs after fuel combustion in the cylinder under determination and minimum angular crankshaft speed within the second crank angle range of the cylinder.

17. A method as in claim 16 wherein:

the determining step calculates a second parameter of an arbitrary next cylinder based on a difference between maximum angular crankshaft speed and minimum angular crankshaft speed, the maximum angular speed being detected within the first crank angle range of the arbitrary succeeding cylinder in which fuel combustion occurs after fuel combustion in the next cylinder, the minimum angular speed being detected within the second crank angle range of the arbitrary next cylinder in which a fuel combustion occurs just before fuel combustion in the arbitrary succeeding cylinder, and the determining step determines whether abnormal combustion has occurred based on a difference between the first-mentioned parameter and the second parameter.

18. A method as in claim 16 wherein:

the determining step calculates a second parameter of an arbitrary next cylinder based on a difference between maximum angular crankshaft speed and minimum angular crankshaft speed, the maximum value of the angular crankshaft speed being detected within the first crank angle range of the arbitrary succeeding cylinder in which fuel combustion occurs after the fuel combustion in the next cylinder, the minimum value of the angular crankshaft speed being detected within the second crank angle range of the arbitrary next cylinder in which fuel combustion occurs just before fuel combustion in the arbitrary succeeding cylinder, and the determining step determines whether abnormal combustion has occurred based on a ratio between the first-mentioned parameter and the second parameter.

19. A method for detecting a misfire abnormality of fuel combustion in a cylinder of an internal combustion engine, the method comprising:

generating a signal indicative of angular crankshaft speed which varies linearly with respect to variation of angular crankshaft speed;

defining a crank angle range corresponding to at least one part of a power stroke in the cylinder; and determining whether an abnormal combustion has occurred in the cylinder based on a parameter representing maximum angular crankshaft speed within the crank angle range.

20. A method as in claim 19 wherein:

the determining step determines whether abnormal combustion has occurred based on a difference between the first-mentioned parameter and a second parameter of an arbitrary next cylinder in which fuel combustion occurs, the second parameter representing a maximum angular crankshaft speed of the arbitrary next cylinder, and the maximum value being detected within the crank angle range.

21. A method as in claim 19 wherein:

the determining step determines whether abnormal combustion has occurred based on a ratio between the first-mentioned parameter and a second parameter of an arbitrary next cylinder in which fuel combustion occurs, the second parameter representing a maximum value angular crankshaft speed of the arbitrary next cylinder, and the maximum value being detected in the crank angle range.

22. A method for detecting a misfire abnormality of fuel combustion in a cylinder of an internal combustion engine, the method comprising:

generating a signal indicative of angular crankshaft speed which varies linearly with respect to variation of crankshaft angular speed;

defining a crank angle range corresponding to at least one part of a power stroke in the cylinder; and determining whether an abnormal combustion has occurred based on a parameter representing minimum angular crankshaft speed within the crank angle range.

23. A method as in claim 22 wherein:

the determining step determines whether abnormal combustion has occurred based on a difference between the first-mentioned parameter and a second parameter of an arbitrary next cylinder in which fuel combustion occurs, the second parameter representing a minimum angular crankshaft speed of the arbitrary next cylinder, and the minimum value being detected within the crank angle range of the arbitrary next cylinder.

24. A method as in claim 22 wherein:

the determining step determines whether abnormal combustion has occurred based on a ratio between the first-mentioned parameter and a second parameter of an arbitrary next cylinder in which fuel combustion occurs, the second parameter representing minimum angular crankshaft speed of the arbitrary next cylinder, and the minimum value being detected within the crank angle range of the arbitrary next cylinder.

* * * * *